United States Patent [19]

Shirako

[11] Patent Number: 4,516,181

[45] Date of Patent: May 7, 1985

[54] TAPE CASSETTE LINER SHEET ARRANGEMENT

[75] Inventor: Hideo Shirako, Tokyo, Japan

[73] Assignee: Olympus Optical Co., Ltd., Tokyo, Japan

[21] Appl. No.: 411,279

[22] Filed: Aug. 25, 1982

[30] Foreign Application Priority Data

Sep. 9, 1981 [JP] Japan ............................ 56-134073[U]

[51] Int. Cl.³ ........................ G03B 1/04; G11B 15/32
[52] U.S. Cl. ..................................... 300/132; 242/199
[58] Field of Search ........................ 360/132; 242/199

[56] References Cited

U.S. PATENT DOCUMENTS

| | | | |
|---|---|---|---|
| 3,675,875 | 7/1972 | Schmidt | 242/199 |
| 4,102,515 | 7/1978 | Milants | 360/132 X |
| 4,127,242 | 11/1978 | Hashimoto et al. | 242/199 |
| 4,289,285 | 9/1981 | Ishida et al. | 242/199 |
| 4,328,936 | 5/1982 | Bordignon | 242/199 |
| 4,333,620 | 6/1982 | Ishida et al. | 360/132 X |

*Primary Examiner*—John H. Wolff
*Attorney, Agent, or Firm*—Frishauf, Holtz, Goodman & Woodward

[57] ABSTRACT

A tape cassette comprises a pair of cassette halves coupled with each other, a magnetic tape housed in the cassette halves, and a pair of liner sheets arranged individually between the cassette halves and the magnetic tape. Each cassette half has a plurality of projections protruding toward the magnetic tape from that surface thereof which faces the other cassette half. Each liner sheet has a plurality of hollow protrusions protruding toward each opposite cassette half from those portions of each liner sheet which correspond to the projections of the opposite cassette half and elastically abutting against their corresponding projections, whereby the magnetic tape is elastically held on both sides.

8 Claims, 7 Drawing Figures

TAPE CASSETTE LINER SHEET ARRANGEMENT

BACKGROUND OF THE INVENTION

This invention relates to tape cassettes, such as compact cassettes, micro cassettes, video cassettes, etc., which housed a magnetic tape, reel hubs, and associated parts.

A tape cassette generally comprises a pair of cassette halves coupled with each other to form a housing, and a magnetic tape wound around a pair of reel hubs and contained in the housing. Also, the tape cassette has a pair of elastic liner sheets arranged individually between their corresponding cassette halves and the magnetic tape. Thus, the magnetic tape is vertically held between the liner sheets to prevent it from being wound irregularly. For more secure prevention of the irregular winding of the magnetic tape, there has recently been provided a tape cassette in which a plurality of projections are formed on the facing surfaces of the cassette halves, and the liner sheets are interposed individually between the projections and the magnetic tape. According to this tape cassette, the liner sheets are liable to move less along the direction of the thickness of the cassette due to the existence of the projections. Thus, the magnetic tape and reel hubs can be sustained in the central portion of the cassette along its thickness, so that irregular winding of the magnetic tape can be prevented. With this cassette, however, once irregular winding of the magnetic tape is caused so that the liner sheets are pressed by the magnetic tape, the liner sheets engage the projections to be trapped thereby, and lose their elasticity. As a result, the frictional resistance between the magnetic tape and the liner sheets increases, which varies the traveling speed of the magnetic tape.

Also provided is another tape cassette in which a plurality of linear projections with arcuate edges are formed on the facing surfaces of the liner sheets, and the magnetic tape and reel hubs are elastically held between the projections. These liner sheets are in linear contact with the magnetic tape, with the edges of the projections abutting against the magnetic tape. Accordingly, the frictional resistance between the liner sheets and the magnetic tape is small, and the edges of the magnetic tape are less liable to be damaged. In this tape cassette, however, if the magnetic tape suffers irregular winding, it vibrates under a temporary high pressure when a disorderly portion of the magnetic tape touches the projections of the liner sheets. This results in wow or flutter.

SUMMARY OF THE INVENTION

This invention is contrived in consideration of the foregoing circumstances, and is intended to provide a tape cassette capable of securely preventing the irregular winding of a magnetic tape, and of reducing the frictional resistance between the magnetic tape and liner sheets even in case of irregular winding.

According to one aspect of the invention, there is provided a tape cassette which comprises a pair of cassette halves each having a pair of reel shaft insertion holes and coupled with each other to form a housing, each of the cassette halves having a plurality of projections protruding toward the other cassette half from that surface thereof which faces the other cassette half, a pair of reel hubs rotatably housed in the cassette halves, a magnetic tape housed in the cassette halves and wound around the reel hubs, and a pair of liner sheets arranged individually between the cassette halves and the magnetic tape, each having a plurality of hollow protrusions protruding toward each cassette half opposite from those portions of each liner sheet which correspond to the projections of the opposite cassette half and elastically abutting against their corresponding projections, whereby the magnetic tape is elastically held on both sides to be prevented from being wound irregularly. According to the present tape cassette, the pair of liner sheets are located closer to the magnetic tape than the conventional liner sheets, so that the magnetic tape can be sustained in the central portion of the tape cassette along its thickness. Thus, the magnetic tape is allowed to move less along the thickness of the tape cassette, so that irregular winding of the magnetic tape can be prevented more securely. In this tape cassette, moreover, each liner sheet has a plurality of hollow protrusions elastically abutting against the projections of its corresponding cassette half. Therefore, even if subjected to a pressure caused by irregular winding, such as stepped winding of the magnetic tape, the liner sheets can move against the pressure owing to elastic deformation of the hollow protrusions. Thus, the frictional resistance between the liner sheets and the magnetic tape is prevented from increasing, and the variation of the traveling speed of the magnetic tape can be reduced.

BRIEF DESCRIPTION OF THE DRAWINGS

FIGS. 1 to 4 show a tape cassette according to one embodiment of this invention, in which FIG. 1 is a perspective view of the tape cassette, FIG. 2 is a disassembled perspective view of the tape cassette, FIG. 3 is a plan view showing one cassette half provided with a liner sheet, and FIG. 4 is an enlarged sectional view taken along line IV—IV of FIG. 3;

FIGS. 6 and 7 show a second modification of the tape cassette, in which FIG. 6 is a perspective view of one cassette half and one liner sheet, and FIG. 7 is a plan view showing the cassette half of FIG. 6 provided with the liner sheet.

DETAILED DESCRIPTION OF THE PREFERRED EMBODIMENT

Figure 1:
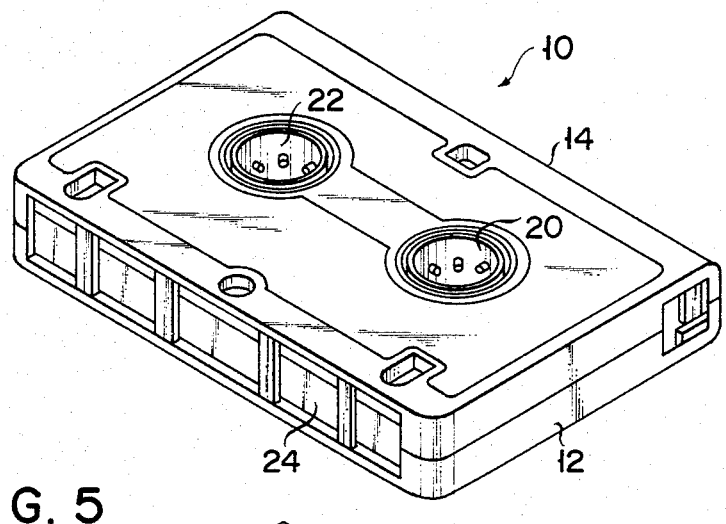
Figure 2:
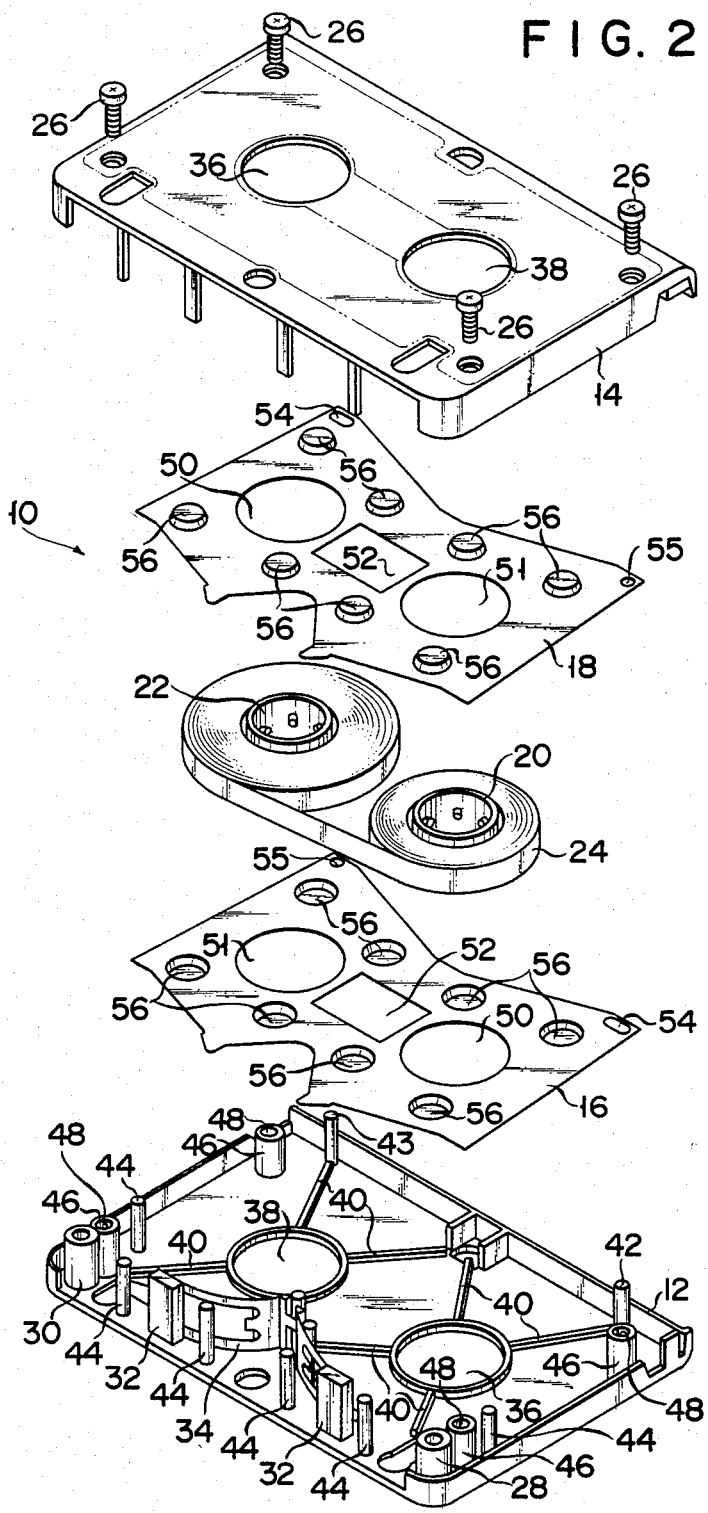

As shown in FIGS. 1 and 2, a micro cassette 10 comprises a pair of cassette halves 12 and 14, a pair of liner sheets 16 and 18, a pair of reel hubs 20 and 22, and a magnetic tape 24 wound around the reel hubs 20 and 22. The liner sheet 16 is interposed between the cassette half 12 and the magnetic tape 24, while the liner sheet 18 is interposed between the cassette half 14 and the magnetic tape 24. The cassette halves 12 and 14 are coupled with each other by means of screws 26 to form a housing, in which the liner sheets 16 and 18, the reel hubs 20 and 22, and the magnetic tape 24 are contained. The micro cassette 10 also comprises a pair of guide rollers 28 and 30, and a pad spring 34 provided with a pair of pads 32. These members are also contained in the cassette halves 12 and 14.

Figure 3:
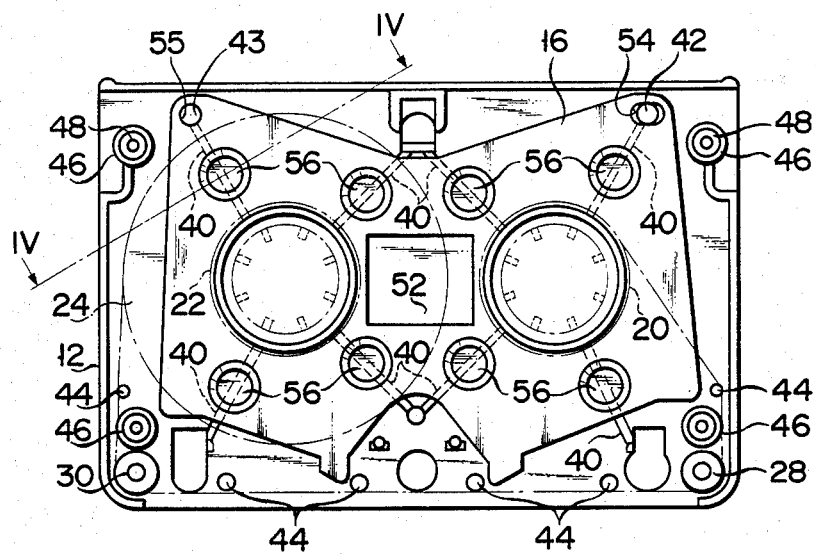

As shown in FIGS. 2 and 3, the cassette half 12 has a pair of circular reel shaft insertion holes 36 and 38. Also, the cassette half 12 has eight bar-shaped projections 40 protruding toward the other cassette half 14 from that surface of the cassette half 12 which faces the cassette half 14. The bar-shaped projections 40 extend radially from the outer peripheral edges of the reel shaft insertion holes 36 and 38. Each set of four bar-shaped projections 40 are arranged at intervals along the circumference of their corresponding reel shaft insertion hole 36 or 38. Moreover, the cassette half 12 has a pair of positioning pins 42 and 43 spaced and protruding from its upper end portion, and a plurality of guide pins 44 protruding from its lower end portion. Column sections 46 are erected on the four corners of the cassette half 12, and screw holes 48 for mating the cassette halves 12 and 14 are formed individually in the column sections 46. The guide rollers 28 and 30 are rotatably attached to the lower right and left end portions, respectively, of the cassette half 12. The other cassette half 14 forms a substantially symmetrical configuration with the cassette half 12, having reel shaft insertion holes 36 and 38 and bar-shaped projections (not shown) formed on that surface thereof which faces the cassette half 12. In this embodiment, the cassette halves 12 and 14 are formed of transparent plastics.

The liner sheet 16 has a pair of circular holes 50 and 51 corresponding to the reel shaft insertion holes 36 and 38, respectively, of the cassette half 12. Also, the liner sheet 16 has a window opening 52 formed between the holes 50 and 51, and holes 54 and 55 capable of engaging the positioning pins 42 and 43, respectively, of the cassette half 12. The liner sheet 16 is further provided with eight hollow protrusions 56 formed by embossing. Each set of four protrusions 56 are arranged along the circumference of their corresponding hole, 50 or 51. Having a circular cross section, the protrusions 56 protrude from the liner sheet 16 toward the cassette half 12. The diameter of each protrusion 56 is greater than the width of each bar-shaped projection 40. As seen from FIG. 3, the protrusions 56 are so arranged as to be located individually on the bar-shaped projections 40 when the liner sheet 16 is attached to the cassette half 12. Thus, the protrusions 56 elastically abut against the projections 40. Preferably, the centers of the protrusions 56 are located on their corresponding projections 40. The other liner sheet 18 forms a symmetrical configuration with the liner sheet 16, and has eight hollow protrusions 56 which protrude toward the cassette half 14.

Figure 4:
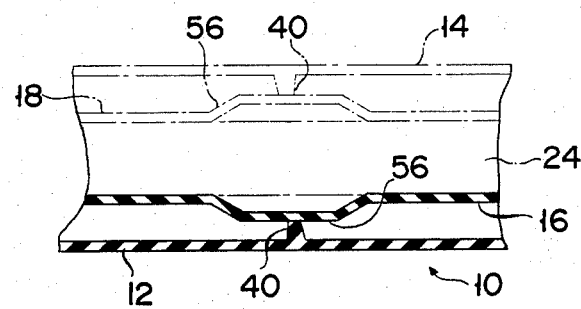

FIG. 3 shows a state in which the cassette half 12 is mounted with the liner sheet 16, the reel hubs 20 and 22, and the magnetic tape 24. The liner sheet 16 is set in position relative to the cassette half 12 with the holes 54 and 55 engaged with the positioning pins 42 and 43, respectively, of the cassette half 12. The hole 54 is elongated horizontally so that the liner sheet 16 can bend. The hollow protrusions 56 are elastically in contact with the bar-shaped projections 40. The reel hubs 20 and 22 are rotatably fitted in the reel shaft insertion holes 36 and 38, respectively. The magnetic tape 24 is passed around the guide pin 44 and the guide rollers 28 and 30 to be guided thereby in traveling. The other cassette half 14 fitted with the liner sheet 18 is attached to the cassette half 12 by means of the screws 26 so that the magnetic tape 24 is vertically and elastically held between the liner sheets 16 and 18, as shown in FIG. 4. The liner sheets 16 and 18 have their respective protrusions 56 protruding toward the cassette halves 12 and 14, respectively, and elastically abutting against the projections 40 protruding from the cassette halves 12 and 14 toward the magnetic tape 24. Thus, the liner sheets 16 and 18 adjoin the magnetic tape 24 so that the magnetic tape 24 is sustained in the central portion of the cassette 10 along its thickness. Accordingly, the liner sheets 16 and 18 can prevent the magnetic tape 24 from being wound irregularly. Since the hollow protrusions 56 are located on the projections 40, the liner sheets 16 and 18 can entirely adjoin the magnetic tape 24 even if the protrusions 56 are short. Therefore, the protrusions 56 need not be made long; thus, the liner sheets 16 and 18 will not be distorted by the formation of the protrusions 56 thereon. Even if subjected to a pressure caused by stepped winding or other irregular winding of the magnetic tape 24, the liner sheets 16 and 18 will move against the pressure through elastic deformation of the hollow protrusions 56. Since the width of each bar-shaped projection 40 is narrower than the diameter of each hollow protrusion 56, the protrusions 56 can easily suffer elastic deformation in any direction. Accordingly, the frictional resistance between the magnetic tape 24 and the liner sheets 16 and 18 will not increase, so that the traveling speed of the magnetic tape 24 will be prevented from varying.

Thus, according to the micro cassette 10 of the invention, the liner sheets 16 and 18 have elasticity and flexibility, so that the magnetic tape 24 can enjoy stable traveling without irregular winding.

Figure 5:
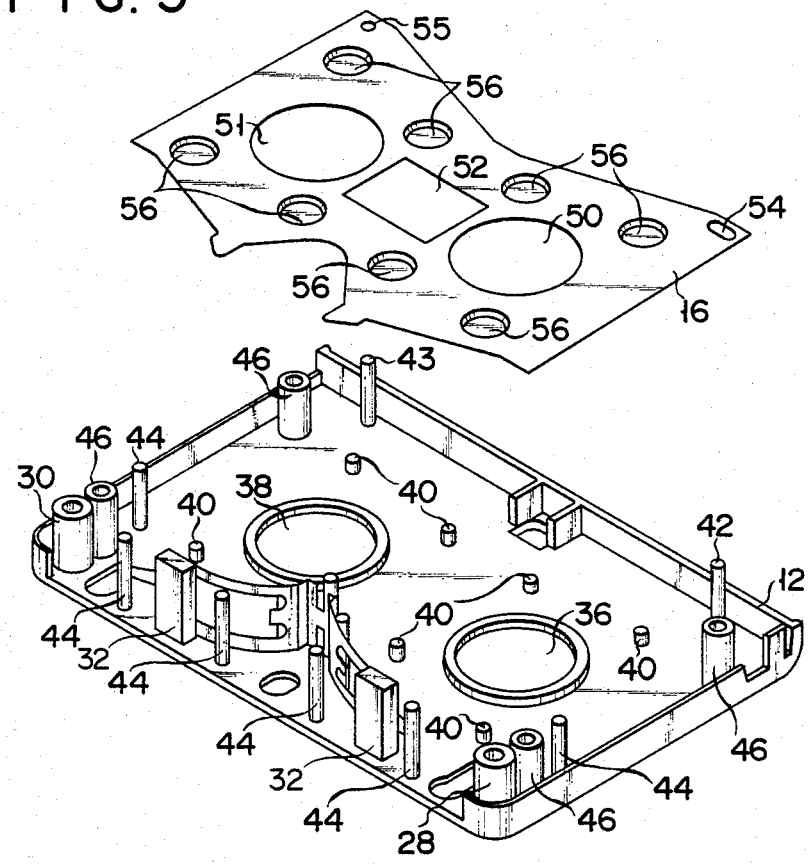
FIG. 5 is a disassembled perspective view showing part of a first modification of the tape cassette.

In the embodiment described above, the projections 40 of the cassette halves are in the form of bars extending radially from the reel shaft insertion holes 36 and 38. As shown as a first modification in FIG. 5, however, columnar projections may be used for the projections 40 with the same effect. These projections 40 are spaced and arranged along the circumferences of the reel shaft insertion holes 36 and 38. The projections 40 are so arranged as to abut against the respective centers of their corresponding hollow protrusions 56 when the liner sheet 16 is attached to the cassette half 12. The diameter of each projection 40 is shorter than that of each hollow protrusion 56.

Figure 6:
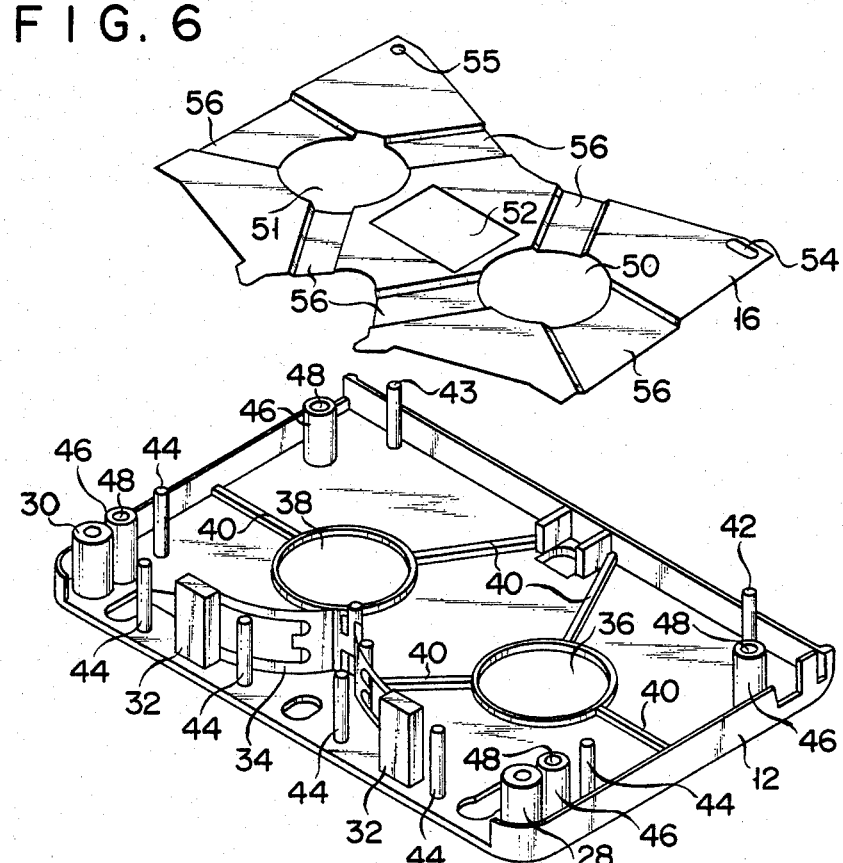
Figure 7:
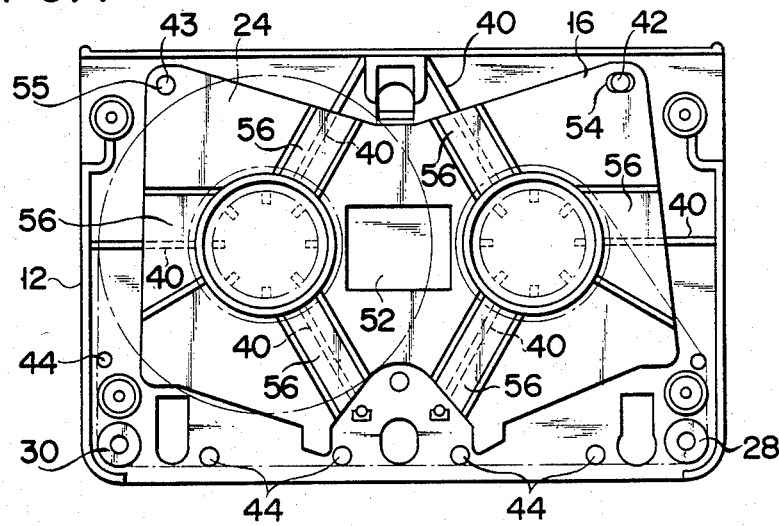

In a second modification shown in FIGS. 6 and 7, the hollow protrusions 56 on the liner sheet 16 are in the form of belts protruding toward the cassette half 12. The protrusions 56 extend radially from the outer peripheral edges of the holes 50 and 51, three for each hole. The cassette half 12 has six bar-shaped projections 40 extending radially from the outer peripheral edges of the reel shaft insertion holes 36 and 38 so as to correspond to the hollow protrusions 56, three for each insertion hole. The width of each projection 40 is narrower than that of each hollow protrusion 56, and protrudes toward the liner sheet 16. As seen from FIG. 7, the hollow protrusions 56 elastically abut against the projections 40 as the liner sheet 16 is attached to the cassette half 12. The protrusions 56 are so formed that their centers are located individually on the projections 40. As in the foregoing embodiment, the liner sheet 16 has enough elasticity and flexibility to prevent irregular winding of the magnetic tape.

According to this second modification, supply and take-up portions of the magnetic tape 24 are sure to pass over the hollow protrusions 56, and do not touch the liner sheet 16. Accordingly, the supply and take-up portions of the magnetic tape 24 can travel without being influenced by a warp or the like in the liner sheet 16. Thus, the magnetic tape 24 can enjoy stable traveling.

In the first and second modifications, the other members have the same construction as those of the micro cassette 10 in the foregoing embodiment.

This invention is not limited to the micro cassette, and may also be applied to a compact cassette, video cassette, etc. The projections of the cassette halves and the protrusions of the liner sheets may be changed in shape and number as required.

What is claimed is:

1. A tape cassette, comprising:
a pair of cassette halves each having a pair of reel shaft insertion holes and coupled with each other to form a housing, each said cassette half having a plurality of projections protruding toward the other cassette half from that surface thereof which faces the other cassette half;
a pair of reel hubs arranged for rotation in the region of the reel shaft insertion holes in the cassette halves;
a magnetic tape housed in the cassette halves and wound around the reel hubs; and
a pair of liner sheets, one of which is arranged between one of the cassette halves and the magnetic tape and the other of which is arranged between the other cassette half and the magnetic tape, each of said sheets having a plurality of hollow protrusions which protrude toward the associated cassette half and elastically abut the projections of the cassette half, so that the magnetic tape as wound on said reel hubs is supported elastically on both sides by substantial surface portions of said liner sheets at the central portion of said housing along the direction of the thickness of said housing, wherein the magnetic tape is prevented from being wound irregularly.

2. The tape cassette according to claim 1, wherein said projections of the cassette halves are spaced from one another along the direction of the circumferences of the reel shaft insertion holes.

3. The tape cassette according to claim 2, wherein each said liner sheet has a pair of holes corresponding to the reel shaft insertion holes of the cassette halves, and the hollow protrusions are spaced from one another along the direction of the circumferences of the holes.

4. The tape cassette according to claim 3, wherein said projections of the cassette halves are in the form of bars extending radially from the outer peripheral edge of each reel shaft insertion hole.

5. The tape cassette according to claim 4, wherein each said protrusion of the liner sheets has a circular cross section whose center is located on the corresponding projection of the cassette half, the diameter of each protrusion of the liner sheets being greater than the width of each corresponding projection of the cassette half.

6. The tape cassette according to claim 4, wherein each said protrusion of the liner sheets is in the form of a belt extending radially from the outer peripheral edge of each hole and having its center along the circumferential direction located on its corresponding projection of the cassette half, the width of each protrusion of the liner sheets being greater than that of each projection of the cassette half.

7. The tape cassette according to claim 3, wherein said projections of the cassette halves are columnar.

8. The tape cassette according to claim 7, wherein each said protrusion of the liner sheets has a circular cross section whose center is located on the corresponding projection of the cassette half, the diameter of each protrusion of the liner sheets being greater than that of each corresponding projection of the cassette half.

* * * * *